(12) United States Patent
Barthelmess et al.

(10) Patent No.: US 12,480,351 B2
(45) Date of Patent: Nov. 25, 2025

(54) SPINDLE DRIVE FOR A CLOSURE ELEMENT OF A MOTOR VEHICLE

(71) Applicant: Brose Fahrzeugteile SE & Co. Kommanditgesellschaft, Bamberg, Bamberg (DE)

(72) Inventors: Manfred Barthelmess, Scheinfeld (DE); Michael Schneiderbanger, Rattelsdorf (DE); Daniela Schweizer, Coburg (DE); Marco Suess, Bamberg (DE); Christian Umbreit, Bamberg (DE); Tobias Zwosta, Wilhelmsthal (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 18/283,551

(22) PCT Filed: Mar. 24, 2022

(86) PCT No.: PCT/EP2022/057788
§ 371 (c)(1),
(2) Date: Sep. 22, 2023

(87) PCT Pub. No.: WO2022/200508
PCT Pub. Date: Sep. 29, 2022

(65) Prior Publication Data
US 2024/0175307 A1 May 30, 2024

(30) Foreign Application Priority Data

Mar. 24, 2021 (DE) .................... 10 2021 107 376.6

(51) Int. Cl.
*F16H 25/20* (2006.01)
*E05F 15/622* (2015.01)

(52) U.S. Cl.
CPC ....... *E05F 15/622* (2015.01); *E05Y 2600/528* (2013.01); *E05Y 2600/53* (2013.01); *E05Y 2900/50* (2013.01)

(58) Field of Classification Search
CPC ..... F16H 2025/2481; F16H 2025/2034; E05Y 2066/53; E05Y 2600/528; E05F 15/622
See application file for complete search history.

(56) References Cited

U.S. PATENT DOCUMENTS

| 6,772,653 | B1 * | 8/2004 | Franksson | E05F 15/622 74/89.36 |
| 10,883,300 | B2 | 1/2021 | Wittelsbuerger et al. | |
| 11,428,037 | B2 * | 8/2022 | Kummer | B60J 5/106 |

FOREIGN PATENT DOCUMENTS

| DE | 102008062391 | 6/2010 |
| DE | 102012018826 | 3/2014 |

(Continued)

OTHER PUBLICATIONS

Wikipedia, Bayonet Mount, Mar. 14, 2021 (Year: 2021).*

(Continued)

*Primary Examiner* — Gregory Robert Weber
(74) *Attorney, Agent, or Firm* — Pauly, DeVries Smith & Deffner LLC

(57) ABSTRACT

The invention relates to a spindle drive for a closure element of a motor vehicle, which spindle drive has a spindle/spindle nut mechanism which has a spindle and a spindle nut, wherein a motor-side drive portion has a drive unit with a drive motor and the spindle, wherein the spindle is connected downstream of the drive motor, wherein a spindle-nut-side drive portion of the spindle drive has the spindle nut, wherein the spindle drive has a drive housing with at least one housing tube which is fixed axially with respect to the motor-side drive portion, wherein a guide tube is arranged radially within the housing tube, which guide tube (Continued)

is fixed axially with respect to the motor-side drive portion and axially guides a drive component of the spindle drive during the drive movements.

11 Claims, 2 Drawing Sheets

(56) References Cited

FOREIGN PATENT DOCUMENTS

| DE | 102015106356 | | 6/2016 |
|---|---|---|---|
| DE | 102015120563 | | 6/2017 |
| DE | 102017117993 | | 2/2019 |
| DE | 102019101070 | | 7/2020 |
| DE | 102019102288 | | 7/2020 |
| DE | 102019112682 | | 11/2020 |
| DE | 102019112682 | A1 * | 11/2020 |
| DE | 102019121094 | | 2/2021 |
| JP | 532820 | | 1/1978 |
| JP | 2008275085 | | 11/2008 |
| JP | 2017101537 | | 6/2017 |
| WO | 2022200508 | | 9/2022 |

OTHER PUBLICATIONS

"International Search Report and Written Opinion," for PCT Application No. PCT/EP2022/057788 mailed Aug. 19, 2022 (15 pages), no Translation.

Wikipedia.Org "Bajonettverschluss (Bayonet mount)," Wikipedia entry available at URL <https://de.wikipedia.org/w/index.php?title=Bajonettverschluss&oldid=204074559>, retrieved Sep. 30, 2022 (10 pages) with English version.

"International Preliminary Report on Patentability," for PCT Application No. PCT/EP2022/057788 mailed Sep. 12, 2023 (9 pages) English Translation.

"Office Action," for Korean Patent Application No. 10-2023-7036368 mailed Jan. 16, 2025 (5 pages) no English translation.

* cited by examiner

SPINDLE DRIVE FOR A CLOSURE ELEMENT OF A MOTOR VEHICLE

CROSS-REFERENCE TO RELATED APPLICATIONS

This application is a national stage application under 35 U.S.C. 371 of International Patent Application Serial No. PCT/EP2022/057788, entitled "Spindle Drive for a Closure Element of a Motor Vehicle," filed Mar. 24, 2022, which claims priority from German Patent Application No. DE 10 2021 107 376.6, filed Mar. 24, 2021, the disclosure of which is incorporated herein by reference.

FIELD OF THE TECHNOLOGY

Various embodiments relate to a spindle drive for a closing element of a motor vehicle.

BACKGROUND

The known prior art (DE 10 2017 117 993 A1) relates to a spindle drive for a closing element of a motor vehicle.

The spindle drive in question is used within the context of motorized adjustment of any closing elements of a motor vehicle. Closing elements of this type can be, for example, tail-gates, trunk lids, engine hoods, load compartment floors, but also doors, in particular sliding doors, of a motor vehicle. To that extent, the term "closing element" is to be understood broadly in the present case.

A spindle drive of this type serves for the motorized adjustment of a closing element of this type. To this end, the spindle drive has a drive unit, which has a drive motor, and a spindle/spindle nut mechanism which is connected downstream of the drive unit in drive terms and by way of which linear drive movements are generated between the spindle-side drive connector and a spindle nut-side drive connector for opening and closing the closing element. In the open position of the closing element, the spindle drive is correspondingly situated in an extended position, whereas the spindle drive is situated in the retracted position in a closed position of the closing element.

A spindle drive of this type frequently also has a torque tube which serves to guide the spindle nut axially, that is to say along the spindle axis, while the spindle nut is driven by the spindle. A torque tube of this type also serves as an anti-rotation safeguard for the spindle nut and the spindle nut-side drive connector relative to the spindle-side or motor-side drive connector. The torque tube can additionally also have the function of a spring guide tube, and can radially support a coil spring, which preloads the two drive connectors counter to one another, and can guide it as a result. A spring guide tube of this type can also be provided instead of a torque tube, in particular when a corresponding anti-rotation safeguard is provided at a different location.

It is a challenge here for a torque and/or spring guide tube of this type (generally called "guide tube" in the further text) to be integrated into a spindle drive as inexpensively as possible. Specifically in the case of a torque tube which therefore itself has to be non-rotational with respect to the motor-side drive connector, the costs of the spindle drive are increased by the material to be used of the torque tube. Torque tubes are thus usually connected by way of adhesive bonding or welding to a housing tube of the spindle drive which is non-rotational with respect to the motor-side drive portion. As a result of this type of connection, the material selection of the torque tube is restricted to certain materials which are as a rule relatively expensive.

SUMMARY

Various embodiments are based on the problem of configuring and developing the known spindle drive for a closing element of a motor vehicle in such a way that further optimization is achieved with regard to the stated challenge.

The above problem is solved by various features described herein.

In the case of a spindle drive with a guide tube which is, in particular, a torque tube, but can fundamentally also be a spring guide tube, the fundamental consideration of providing a positively locking connection with respect to the housing tube is essential. In this way, the material of the guide tube can be selected independently of whether the material permits adhesive bonding or welding. Recourse can be made to inexpensive materials such as PP (polypropylene) or the like. The guide tube can fundamentally also be configured, however, from a different plastic material or from a metal material. In order to produce a positively locking connection of this type, amounting movement is provided between the guide tube and the housing tube or between portions thereof. Here, the mounting movement comprises at least two part movements, of which one is an axial movement and a following one is a radial or tangential movement between two tube portions of the two tubes, possibly also between the two tubes overall.

It is provided in detail that the housing tube which is axially fixed with respect to the motor-side drive portion and the guide tube are connected to one another in a positively locking manner in a mounting movement which comprises at least two part movements which follow one another, and that one part movement is an axial movement, and a following, in particular directly following, part movement is a radial or tangential movement of a tube portion of the housing tube, which is axially fixed with respect to the motor-side drive portion, relative to a tube portion of the guide tube.

Various embodiments provide a spindle drive for a closing element of a motor vehicle, the spindle drive having a spindle/spindle nut mechanism which has, as drive components of the spindle drive, a spindle and a spindle nut which meshes with it for generating linear drive movements along a geometric spindle axis, a motor-side drive portion of the spindle drive having a drive unit with a drive motor and the spindle, the spindle being connected downstream of the drive motor, a spindle nut-side drive portion of the spindle drive having the spindle nut, the two drive portions being connected in each case to a drive connector of the spindle drive in order to output the drive movements, the drive unit and the spindle/spindle nut mechanism being axially fixed with respect to one another and being arranged behind one another along the geometric spindle axis, the spindle drive having a drive housing with at least one housing tube, in particular housing outer tube, which is axially fixed with respect to the motor-side drive portion, a guide tube being arranged at least in portions radially within the housing tube which is axially fixed with respect to the motor-side drive portion, which guide tube is axially fixed with respect to the motor-side drive portion and guides the drive component of the spindle drive axially during the drive movements, wherein the housing tube which is axially fixed with respect to the motor-side drive portion and the guide tube are connected to one another in a positively locking manner in a mounting movement which comprises at least two part movements which follow one another, and in that one part movement is an axial movement, and a following, in particular directly following, part movement is a radial or tangential movement of a tube portion of the housing tube, which is axially fixed with respect to the motor-side drive portion, relative to a tube portion of the guide tube.

In various embodiments, the tube portion of the housing tube is otherwise rigid with respect to the housing tube, and/or the tube portion of the guide tube is otherwise rigid with respect to the guide tube, such as in that the tube portion of the housing tube and the tube portion of the guide tube are connected to one another in an axially positively locking manner via a bayonet connection. Further, in some embodiments, that the bayonet connection is produced by virtue of the fact that, during the mounting movement, a radial projection on the one tube portion, in particular on the tube portion of the housing tube, is moved axially in a first part movement in an associated depression on the other tube portion, in particular on the tube portion of the guide tube, is moved tangentially in the following, in particular directly following, second part movement, and is possibly moved in an axially opposed manner in a following, in particular directly following, third part movement.

In various embodiments, the tube portion of the housing tube can otherwise be deflected elastically with respect to the housing tube, and/or the tube portion of the guide tube can otherwise be deflected elastically with respect to the guide tube, during the axial and/or radial movement. In some embodiments, the tube portion of the housing tube and the tube portion of the guide tube are connected to one another in an axially positively locking manner via a clip connection which is produced by virtue of the fact that, during the mounting movement, the housing tube is overall moved axially relative to the guide tube and, as a result, an elastic latching hook which forms the one tube portion, in particular tube portion of the guide tube, is moved along axially in a first part movement in a position, in which it is deflected radially out of its basic position, on the other tube portion in particular tube portion of the housing tube, and is moved in the following, in particular directly following, second part movement out of the deflected position radially in the direction of its basic position, in particular as far as into its basic position.

In various embodiments, the tube portion of the housing tube can otherwise be deflected elastically with respect to the housing tube, and/or the tube portion of the guide tube can otherwise be deflected elastically with respect to the guide tube, during the axial and/or tangential movement, such as in that the tube portion of the housing tube and the tube portion of the guide tube are connected to one another in an axially positively locking manner via a latching connection which is produced by virtue of the fact that, during the mounting movement, the housing tube is overall moved axially relative to the guide tube, and in the process and elastic beam which forms the one tube portion, in particular tube portion of the guide tube is moved with a pin which projects radially at its distal end and runs during at least one part of the mounting movement in an associated pin guide groove of the other tube portion, in particular tube portion of the housing tube,
in a first part movement in its basic position axially with respect to the other tube portion, in particular tube portion of the housing tube, is moved in a following, in particular directly following, second part movement out of its basic position into a tangentially deflected position, and moves in the following, in particular directly following, third part movement out of the deflected position tangentially in the direction of its basic position, in particular as far as into its basic position.

In various embodiments, the part movements can be carried out within the context of a premounting step, in which the spindle/spindle nut mechanism is premounted to form a premounting unit, and in that an axially fixed connection between the premounted spindle/spindle nut mechanism and the drive unit which, in particular, is premounted to form a premounting unit can be produced in a final mounting step which follows the part movements, in some embodiments, in that the axially fixed connection which is produced in the final mounting step is an integrally joined, non-positive and/or positively locking connection, further in some embodiments, that the axially fixed connection which is produced in the final mounting step is a welded connection and/or adhesive bond between the housing tube, which is axially fixed with respect to the motor-side drive portion, and the guide tube.

BRIEF DESCRIPTION OF THE DRAWINGS

In the following text, various embodiments will be explained in greater detail on the basis of a drawing which illustrates merely exemplary embodiments and in which.

DETAILED DESCRIPTION

Figure 1:
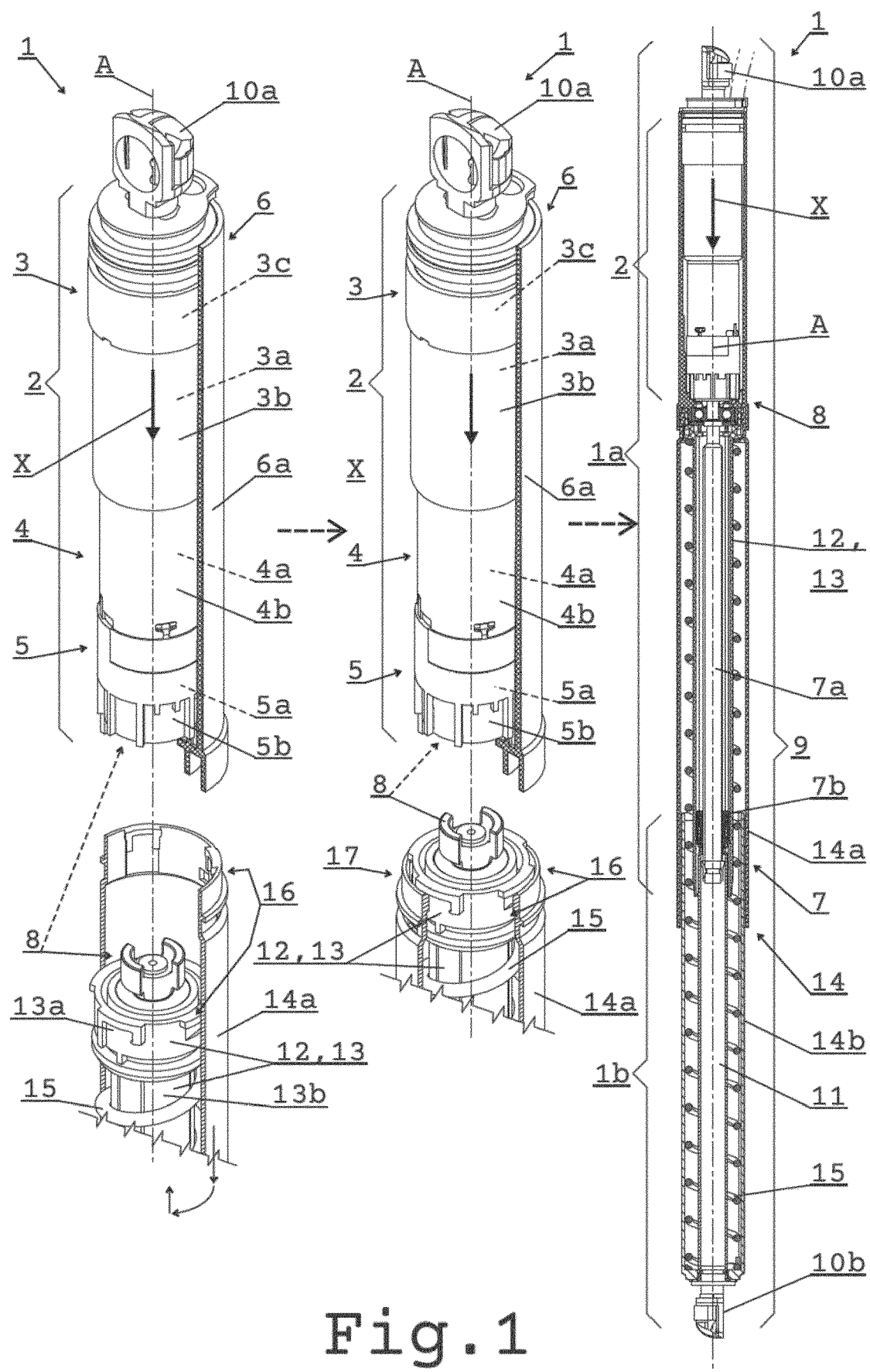
FIG. 1 shows a spindle drive according to the proposal.

In FIG. 1, the drawing shows a spindle drive 1 according to the proposal which is assigned to a closing element arrangement, for example a tailgate arrangement, which is in turn equipped with a closing element (here, a tailgate). The closing element arrangement is assigned to a motor vehicle.

The closing element can also be, as mentioned at the outset, a different closing element of a motor vehicle, in particular a trunk lid, but also a sliding door. All the comments apply mutatis mutandis to different closing elements.

FIG. 1 shows that the spindle drive 1 has a drive unit 2 for opening and closing the closing element. The drive unit 2 comprises a plurality of components 3, 4, 5 which are arranged behind one another in the axial direction X and are connected to one another in a torque-transmitting manner. The components 3, 4, 5 which will be described in even greater detail in the further text are mounted in an axially fixed manner in a housing tube 6a (called a motor tube 6a here) of a drive unit housing 6 of the drive unit 2.

A spindle/spindle nut mechanism 7 with a geometric spindle axis A running in the axial direction X is connected downstream of the drive unit 2 in drive terms, in order to generate linear drive movements in a first adjusting direction which corresponds, in particular, to opening of the closing element and in a second adjusting direction which corresponds, in particular, to closing of the closing element.

The spindle/spindle nut mechanism 7 of the spindle nut 1 is equipped in a way which is customary per se with a rotating spindle 7a and a spindle nut 7b which is in engagement with it. The spindle 7a is coupled to the drive unit 2, here via a coupling arrangement 8.

The spindle drive 1 is divided into two drive portions 1a, 1b, a motor-side drive portion 1a which has the drive unit 2 and the spindle 7a, and a spindle nut-side drive portion 1b which has the spindle nut 7b. In this respect, the spindle 7a and the spindle nut 7b form drive components of the spindle drive 1.

The drive unit 2 and the spindle/spindle nut mechanism 7 are arranged in a drive train 9 which extends from a spindle-side drive connector 10a to a spindle nut-side drive connected 10b. The spindle-side drive connected 10a is connected, in particular crimped, to the drive unit housing 6 here and in some embodiments axially fixedly and/or fixedly for conjoint rotation.

The spindle 7a is guided axially movably in a spindle guide tube 11 which is connected to the spindle nut 7b axially fixedly and fixedly for conjoint rotation and is coupled to the spindle nut-side drive connected 10b axially fixedly and here also fixedly for conjoint rotation. The spindle nut 7b is in turn guided in a guide tube 13, configured as a torque tube 12, of the spindle drive 1 axially movably and, here and in some embodiments, fixedly for conjoint rotation, the torque tube 12 being arranged radially around the spindle 7a and being coupled to the spindle-side drive connected 10a axially fixedly and fixedly for conjoint rotation. In order to hold the spindle nut 7b fixedly for conjoint rotation, the torsion tube 12, in some embodiments, has one or more guide grooves (not shown) which in some embodiments run parallel to the spindle axis A. Since the spindle nut 7b is secured against rotation by way of the torque tube 12, a rotational movement of the spindle 7a is converted by the spindle nut 7b into a translational movement of the spindle guide tube 11 which is coupled fixedly to the spindle nut 7b for conjoint rotation. Accordingly, the two drive portions 1a, 1b or drive connectors 10a, 10b can be adjusted relative to one another in the axial direction X, that is to say along the spindle axis A.

Furthermore, the spindle drive 1 has a housing 14 which receives the spindle/spindle nut mechanism 7 and comprises a housing tube 14a, in particular housing outer tube, and, in some embodiments, a further housing tube 14b which is axially movable with respect to the housing tube 14a and is mounted telescopically with respect to the housing tube 14a, the housing tube 14a being coupled to the spindle-side drive connector 10a axially fixedly and here also fixedly for conjoint rotation, and the housing tube 14b being coupled to the spindle nut-side drive connector 10b axially fixedly and here also fixedly for conjoint rotation. Together with the drive unit housing 6, the housing 14 forms a drive housing of the spindle drive 1.

The drive unit housing 6 or motor tube 6a which is coupled axially fixedly to the spindle-side drive connected 10a serves, in some embodiments, to receive a drive motor unit 3, an intermediate gear unit 4 which is connected downstream of it in drive terms and is coupled to it in a torque-transmitting manner, and an additional component unit 5 which is in turn connected downstream of the latter in drive terms and is coupled to it in a torque-transmitting manner. The drive unit 2 can fundamentally also have only one or only two of said components 3, 4, 5. The drive motor unit 3, in some embodiments, has an electric drive motor 3a and a drive motor housing 3b. A drive motor electronics system 3c which is likewise a constituent part of the drive motor unit 3 is, in some embodiments, also arranged in the drive motor housing 3b. The intermediate gear unit 4 has gear components 4a and an intermediate gear housing 4b. The additional component unit 5, in some embodiments, has at least one additional component 5a and an additional component housing 5b. The additional component housing 5 can be an overload clutch and/or brake unit, in the case of which the respective additional component 5a is formed by an overload clutch and/or a brake.

As the figures show, first of all the spindle-side drive connected 10a, then the drive motor unit 3, then the intermediate gear unit 4, then the additional component unit 5, then the coupling arrangement 8 with spindle 7a arranged on it, and then the torque tube 12 are arranged behind one another in the axial direction X, all of these components being axially fixed with respect to the spindle-side drive connected 10a. The individual components are connected among one another in a torque-transmitting manner in each case via clutches, here claw clutches. It is to be noted that the above-described sequence of the individual components (drive motor unit 3, intermediate gear unit 4, additional component unit 5, torque tube 12) which are axially fixed with respect to the spindle-side drive connected 10a is merely exemplary and can certainly also be different.

The guide tube 13 which is configured as a torque tube 12, in some embodiments, also forms a spring guide tube which is arranged radially within at least one coil spring 15 which runs coaxially with respect to the geometric spindle axis A and preloads the two drive connectors 10a, 10b counter to one another. It is the function of a spring guide tube to radially support and axially guide the at least one coil spring 15. In accordance with one alternative embodiment (not shown here), a spring guide tube of this type which is provided within the at least one coil spring 15 can also be configured without the function of a torque tube 12, the spindle nut 7b then can be secured against rotation by virtue of the fact that an anti-rotation safeguard is provided at a different location between the drive portions 1a, 1b, for example between the two housing tubes 14a, 14b.

The exemplary embodiment which is shown in the figures relates to a spindle drive 1 for a closing element of a motor vehicle, the spindle drive 1 having a spindle/spindle nut mechanism 7 which, as drive components of the spindle drive 1, has a spindle 7a and a spindle nut 7b which meshes with the latter for generating linear drive movements along a geometric spindle axis A, a motor-side drive portion 1a of the spindle drive 1 having a drive unit 2 with a drive motor 3a and the spindle 7a, the spindle 7a being connected downstream of the drive motor 3a, a spindle nut-side drive portion 1b of the spindle drive 1 having the spindle nut 7b, the two drive portions 1a, 1b being connected in each case to a drive connector 10a, 10b of the spindle drive 1 for outputting the drive movements, the drive unit 2 and the spindle/spindle nut mechanism 7 being axially fixed with respect to one another and being arranged behind one another along the geometric spindle axis A, the spindle drive 1 having a drive housing 14 with at least one housing tube 14a, in particular housing outer tube, which is axially fixed with respect to the motor-side drive portion 1a, a guide tube 13 being arranged at least in portions radially within the housing tube 14a which is axially fixed with respect to the motor-side drive portion 1a, which guide tube 13 is axially fixed with respect to the motor-side drive portion 1a and axially guides a drive component of the spindle drive 1 during the drive movements.

It is essential then that the housing tube 14a which is axially fixed with respect to the motor-side drive portion 1a and the guide tube 13 are connected to one another in a positively locking manner in a mounting movement which comprises at least two part movements which follow one another, and that one part movement is an axial movement, and a following, in particular directly following, part movement is a radial or tangential movement of a tube portion 16 of the housing tube 14a, which is axially fixed with respect to the motor side drive portion 1a, relative to a tube portion 16 of the guide tube 13.

The terms "axial", "radial" and "tangential" here and in the further text always relate to the coaxial longitudinal axes of the two tubes, which longitudinal axes run coaxially with respect to the spindle axis A and the finally mounted state of the spindle drive 1. Here, "tangential" means running in the circumferential direction about the longitudinal axes.

An axial movement is a movement with a predominantly axial movement component, that is to say the axial movement component is the greatest and, in particular, only movement component of the movement. A radial movement is correspondingly a movement with a predominantly radial movement component, and a tangential movement is correspondingly a movement with a predominantly tangential movement component.

In the case of the mounting movement, that is to say the part movements which follow one another, the housing tube 14a which is axially fixed with respect to the motor-side drive portion 1a is moved relative to the guide tube 13, in order to arrange the guide tube 13 axially fixedly with respect to the motor-side drive portion 1a.

It is to be emphasized that the axial part movement firstly and the radial or tangential part movements secondly can follow one another directly, that is to say the radial or tangential part movement follows the axial movement directly. It is fundamentally also conceivable, however, that in each case at least one other axial, radial or tangential part movement which is then likewise part of the mounting movement is also provided before or after the axial part movement and/or before after the radial or tangential part movement.

Here, the respective tube portion 16 means an axial tube portion, a radial tube portion and/or a circumferential portion of the respective tube 13 or 14a. A tube portion 16 of this type can also be, for example, a latching hook 16a (FIG. 2a)) or a beam 16b (FIG. 2b)) which are each formed by a circumferential portion of the tube 13 or 14a.

The respective tube portion 16, in particular axial tube portion 16, can otherwise be configured in one piece with the respective tube 13 or 14a, but can also be a part which is otherwise separate from the respective tube 13 or 14a and is otherwise connected, in particular in a positively locking, non-positive and/or integrally joined manner, for example by way of adhesive bonding or welding, to the respective tube 13 or 14a only during the mounting.

The left-hand view at the bottom in FIG. 1 shows by way of example a guide tube 13 comprising two part portions 13a and 13b, the part portion 13a otherwise forming the tube portion 16 in question, in particular axial tube portion 16, and the part portion 13b otherwise forming the tube 13. In various embodiments, the two part portions 13a and 13b are configured in one piece with one another or separately from one another.

In the latter case when they are therefore separate part portions 13a and 13b, the part portion 13a forms, in particular, an adapter for attaching the guide tube 13 otherwise to the housing tube 14a which is axially fixed with respect to the motor-side drive portion 1a. Here, the two part portions 13a and 13b are connected to one another, in particular in a positively locking, non-positive and/or integrally joined manner, in a preceding mounting step in the left-hand view in the illustration. It is fundamentally also conceivable, however, for the two part portions 13a and 13b to be connected to one another, in particular in a positively locking, non-positive and/or integrally joined manner, only when the housing tube 14a which is axially fixed with respect to the motor-side drive portion 1a and the tube portion 16 or part portion 13a have been connected to one another in a positively locking manner in an above mounting movement which comprises the at least two part movements which follow one another.

In the case of the exemplary embodiment which is shown in FIG. 1, it is provided, furthermore, that the tube portion 16 of the housing tube 14a is otherwise rigid with respect to the housing tube 14a, and/or the tube portion 16 of the guide tube 13 is otherwise rigid with respect to the guide tube 13, in some embodiments, that the tube portion 16 of the housing tube 14a and the tube portion 16 of the guide tube 13 are connected to one another in an axially positively locking manner via a bayonet connection 17, further, in some embodiments, that the bayonet connection 17 is produced by virtue of the fact that, during the mounting movement, a radial projection on the one tube portion 16, in particular the tube portion 16 of the housing tube 14a, is moved axially in a first part movement in an associated depression on the other tube portion 16, in particular on the tube portion 16 of the guide tube 13, is moved tangentially in a following, in particular directly following, second part movement, and is possibly moved in an axially opposed manner in a following, in particular directly following, third part movement.

Here, "axially positively locking" means that a positively locking connection is provided at least counter to the first part movement, in particular also counter to the optional third part movement. A tangential positively locking connection can also be provided, that is to say here counter to the second part movement. This has the advantage that the two tubes, said guide tube 13 and said housing tube 14a, cannot rotate with respect to one another.

"Axially opposed" means that the third part movement takes place in an axial direction, that is to say in a direction which is parallel to the spindle axis A and is opposed to the axial direction of the first part movement.

Figure 2:
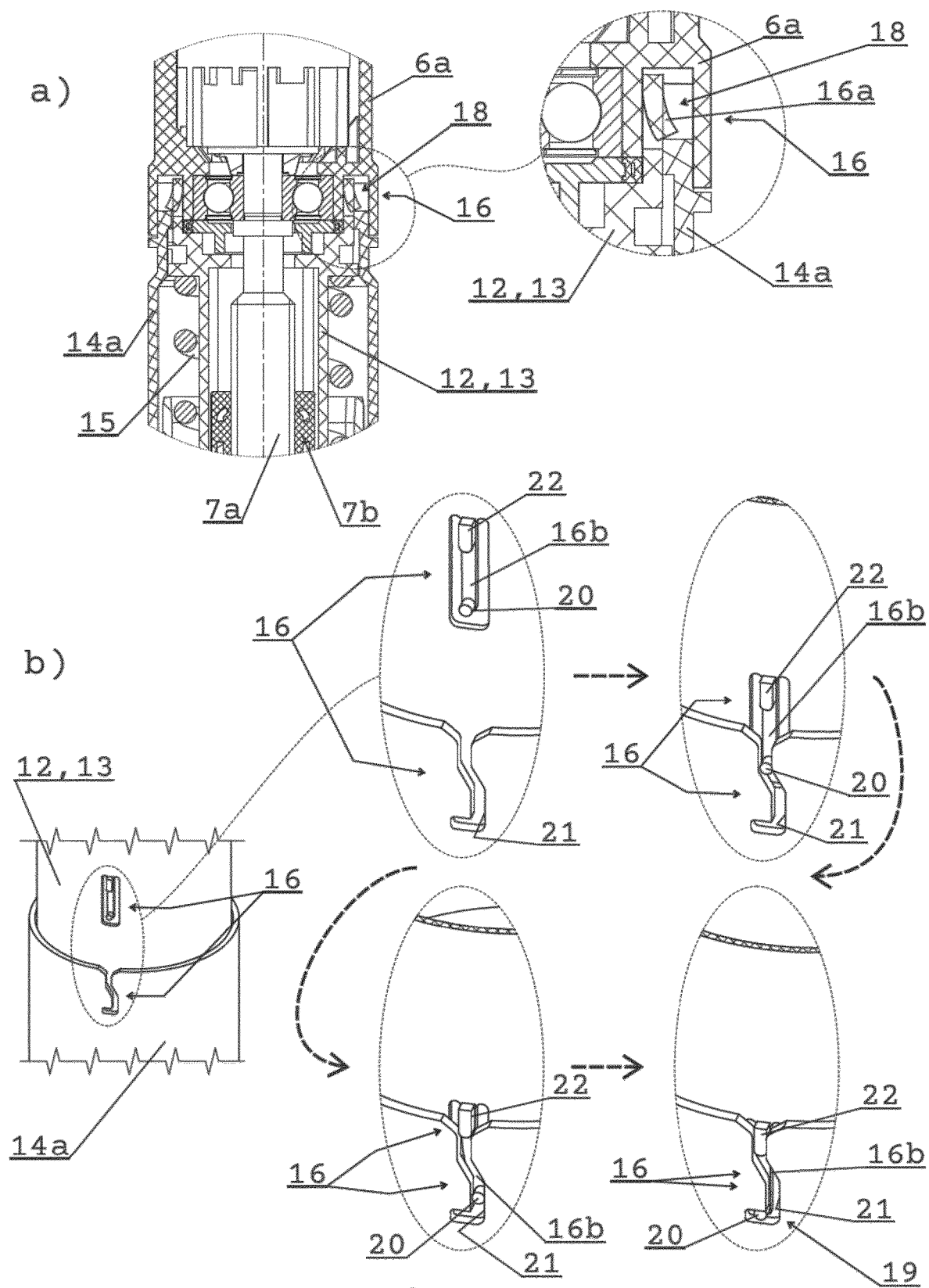
FIG. 2 shows different embodiments of the tube portions of the spindle drive according to FIG. 1.

In the case of the exemplary embodiment which is shown in FIG. 2a), it is provided in contrast that the tube portion 16 of the housing tube 14a can otherwise be deflected elastically with respect to the housing tube 14a, and/or the tube portion 16 of the guide tube 13 can otherwise be deflected elastically with respect to the guide tube 13, during the axial and/or radial movement, such as that the tube portion 16 of the housing tube 14a and the tube portion 16 of the guide tube 13 are connected to one another in an axially positively locking manner via a clip connection 18 which is produced by virtue of the fact that, during the mounting movement, the housing tube 14a overall is moved axially relative to the guide tube 13 and, as a result, an elastic latching hook 16a which forms the one tube portion 16, in particular tube portion 16 of the guide tube 13, is moved axially along in a first part movement in a position, in which it is deflected radially out of its basic position, on the other tube portion 16, in particular tube portion 16 of the housing tube 14a, and moves out of the deflected position radially in the direction of its basic position, in particular as far as into its basic position, in a following, in particular directly following, second part movement.

Here and in the further text, "can be deflected elastically" can mean that the tube portion 16 of the respective tube 13 or 14a can be pushed out of its basic position which it assumes in the load-free state during the respective part movement by way of a force, exerted by the tube portion 16 of the other tube 14a or 13, into a deflected position and, due to the elasticity, can move itself back again in the direction of the basic position and, in some embodiments, again as far as into the basic position as soon as the previously exerted force decreases or drops again after the conclusion of the preceding part movement which has led to the deflection.

A clip connection 18 can be realized by way of individual latching hooks 16a to an associated counterpart, in particular a dedicated associated counterpart per latching hooks 16a, for example of a latching receptacle. A clip connection 18 of this type has the advantage that the tubes 13, 14a cannot rotate with respect to one another. A clip connection 18 in the form of a ring snap connection is also conceivable.

"Axially positively locking" means here that a positively locking connection is provided at least counter to the first part movement, but in particular also in the direction of the first part movement. A tangential positively locking connection can fundamentally also be provided here.

In the case of the exemplary embodiment which is shown in FIG. 2b), it is provided finally that the tube portion 16 of the housing tube 14a can otherwise be deflected elastically with respect to the housing tube 14a, and/or the tube portion 16 of the guide tube 13 can otherwise be deflected elastically with respect to the guide tube 13, during the axial and/or tangential movement, in some embodiments that the tube portion 16 of the housing tube 14a and the tube portion 16 of the guide tube 13 are connected to one another in an axially positively locking manner via a latching connection 19 which is produced by virtue of the fact that, during the mounting movement, the housing tube 14a overall is moved axially relative to the guide tube 13, and an elastic beam 16b which forms the one tube portion 16, in particular tube portion 16 of the guide tube 13, is moved in the process with a pin 20 which projects radially at its distal end and, during at least one part of the mounting movement, runs in an associated pin guide groove 21 of the other tube portion 16, in particular tube portion 16 of the housing tube 14a, in a first part movement in its basic position axially with respect to the other tube portion 16, in particular tube portion 16 of the housing tube 14a, is moved in a following, in particular directly following, second part movement out of its basic position into a tangentially deflected position, and moves in the following, in particular directly following, third part movement out of the deflected position tangentially in the direction of its basic position, in particular as far as into its basic position.

A beam 16b means an elongate, that is to say beam-shaped, elastically bendable material portion of the respective tube 13 or 14a.

Here, the "distal" end is the end which is spaced apart from the opposite end, by way of which the beam 16b is otherwise fastened to the tube 13 or 14a, that is to say the end which can be deflected the furthest. The other end is accordingly the "proximal" end.

Here, "axially positively locking" means that there is a positively locking connection at least counter to the first part movement, but in particular also in the direction of the first part movement. A tangential positively locking connection can fundamentally also be provided.

As FIG. 2b) shows, a radially projecting guide block 22 can be provided on the beam 16b at its proximal end or inner tube portion 16 which is axially adjacent with respect to the proximal end, which guide block 22 is also introduced into the pin guide groove 21 after conclusion of the last part movement, in order to achieve a tangential positively locking connection between the tubes 13, 14a via this. It is also fundamentally conceivable, however, for the tangential positively locking connection to be achieved solely via the radially projecting pin 20.

The terms "pin" and "guide block" are to be understood broadly here and mean a radially outwardly or inwardly projecting projection which is suitable for being guided in or through the pin guide groove 21.

Furthermore, it can be provided that the part movements can be carried out within the context of a premounting step, in which the spindle/spindle nut mechanism 7 is premounted to form a premounting unit, and that an axially fixed connection can be produced between the premounted spindle/spindle nut mechanism 7 and the drive unit 2, which is in particular premounted to form a premounting unit, in a final mounting step which follows the part movements, in some embodiments, that the axially fixed connection which is produced in the final mounting step is an integrally joined, non-positive and/or positively locking connection, in some embodiments, that the axially fixed connection which is produced in the final mounting step is a welded connection and/or adhesive bond between the guide tube 14a, which is axially fixed with respect to the motor-side drive portion 1a, and the guide tube 13.

The housing tube 14a which is axially fixed with respect to the motor-side drive portion 1a, the guide tube 13 and the drive unit housing 6, in particular the motor tube 6a, are therefore of corresponding configuration, such that the above movement sequences can be carried out.

The invention claimed is:

1. A spindle drive for a closing element of a motor vehicle, the spindle drive comprising a spindle/spindle nut mechanism which comprises, as drive components of the spindle drive, a spindle and a spindle nut which meshes with the spindle for generating linear drive movements along a geometric spindle axis, a motor-side drive portion of the spindle drive comprising the spindle and a drive unit with a drive motor unit, the drive motor unit comprising a drive motor, the spindle being connected downstream of the drive motor, a spindle nut-side drive portion of the spindle drive having the spindle nut, the motor-side drive portion and the spindle nut-side drive portion being connected in each case to a drive connector of the spindle drive in order to output the drive movements, the drive unit and the spindle/spindle nut mechanism being axially fixed with respect to one another and being arranged behind one another along the geometric spindle axis, the spindle drive having a drive housing with a drive unit housing, the drive unit housing comprising a motor tube configured to receive the drive motor unit, and at least one housing tube, wherein the at least one housing tube is axially fixed with respect to the motor-side drive portion, a guide tube being arranged at least in portions radially within the housing tube which is axially fixed with respect to the motor-side drive portion, which guide tube is axially fixed with respect to the motor-side drive portion and guides the drive component of the spindle drive axially during the drive movements, wherein the housing tube which is axially fixed with respect to the motor-side drive portion and the guide tube are configured to be connected to one another in a positively locking manner, wherein the housing tube and the guide tube are configured to be connected in the positive locking manner via at least two part movements which follow one another, and wherein one part movement is an axial movement, and a following part movement is a radial or tangential movement of a tube portion of the housing tube, which is axially fixed with respect to the motor-side drive portion, relative to a tube portion of the guide tube.

2. The spindle drive as claimed in claim 1, wherein the tube portion of the housing tube is rigid with respect to the housing tube, and/or the tube portion of the guide tube is rigid with respect to the guide tube,
  wherein the tube portion of the housing tube and/or the tube portion of the guide tube is configured to be moved tangentially in the following second part movement, and
  wherein the tube portion of the housing tube and/or the tube portion of the guide tube is configured to be moved in an axially opposed manner in a following third part movement.

3. The spindle drive as claimed in claim 2, wherein the tube portion of the housing tube and the tube portion of the guide tube are connected to one another in an axially positively locking manner via a bayonet connection.

4. The spindle drive as claimed in claim 3, wherein the bayonet connection is produced by virtue of the fact that, during the mounting movement, a radial projection on the tube portion that is configured to be moved axially in a first part movement in an associated depression on the other tube portion.

5. The spindle drive as claimed in claim 1, wherein the tube portion of the housing tube can otherwise be deflected elastically with respect to the housing tube, and/or the tube portion of the guide tube can otherwise be deflected elastically with respect to the guide tube, during the axial and/or radial movement, and
  is moved in the following second part movement out of the deflected position radially in the direction of its basic position.

6. The spindle drive as claimed in claim 5, wherein the tube portion of the housing tube and the tube portion of the guide tube are connected to one another in an axially positively locking manner via a clip connection which is produced by virtue of the fact that, during the mounting movement, the housing tube is overall moved axially relative to the guide tube and, as a result, an elastic latching hook which forms the one tube portion, in particular tube portion of the guide tube, is moved along axially in a first part movement in a position, in which it is deflected radially out of its basic position, on the other tube portion.

7. The spindle drive as claimed in claim 1, wherein the tube portion of the housing tube is configured to be deflected elastically with respect to the housing tube, and/or the tube portion of the guide tube is configured to be deflected elastically with respect to the guide tube, during the axial or tangential movement,
  in a first part movement in its basic position axially with respect to the other tube portion is configured to be moved in a following second part movement out of its basic position into a tangentially deflected position, and
  is configured to move in the following third part movement out of the deflected position tangentially in the direction of its basic position.

8. The spindle drive as claimed in claim 7, wherein tube portion of the housing tube and the tube portion of the guide tube are connected to one another in an axially positively locking manner via a latching connection which is configured to be produced by virtue of the fact that, during the mounting movement, the housing tube is overall moved axially relative to the guide tube, and in the process an elastic beam which forms the one tube portion, in particular tube portion of the guide tube is moved with a pin which projects radially at its distal end and runs during at least one part of the mounting movement in an associated pin guide groove of the other tube portion, in particular tube portion of the housing tube.

9. The spindle drive as claimed in claim 1, wherein the at least two part movements can be carried out within the context of a pre-mounting step, in which the spindle/spindle nut mechanism is configured to be premounted to form a premounting unit, and wherein an axially fixed connection between the premounted spindle/spindle nut mechanism and the drive unit which is configured to be premounted to form a premounting unit can be produced in a final mounting step which follows the part movements.

10. The spindle drive as claimed in claim 9, wherein the axially fixed connection which is configured to be produced in the final mounting step is an integrally joined, non-positive or positively locking connection.

11. The spindle drive as claimed in claim 10, wherein the axially fixed connection which is configured to be produced in the final mounting step is a welded connection or adhesive bond between the housing tube, which is axially fixed with respect to the motor-side drive portion, and the guide tube.

* * * * *